July 28, 1959 F. A. VOSSENBERG 2,896,806
PLATFORM PIVOTING MEANS FOR INDUSTRIAL TRUCK
Filed June 15, 1956 3 Sheets-Sheet 1
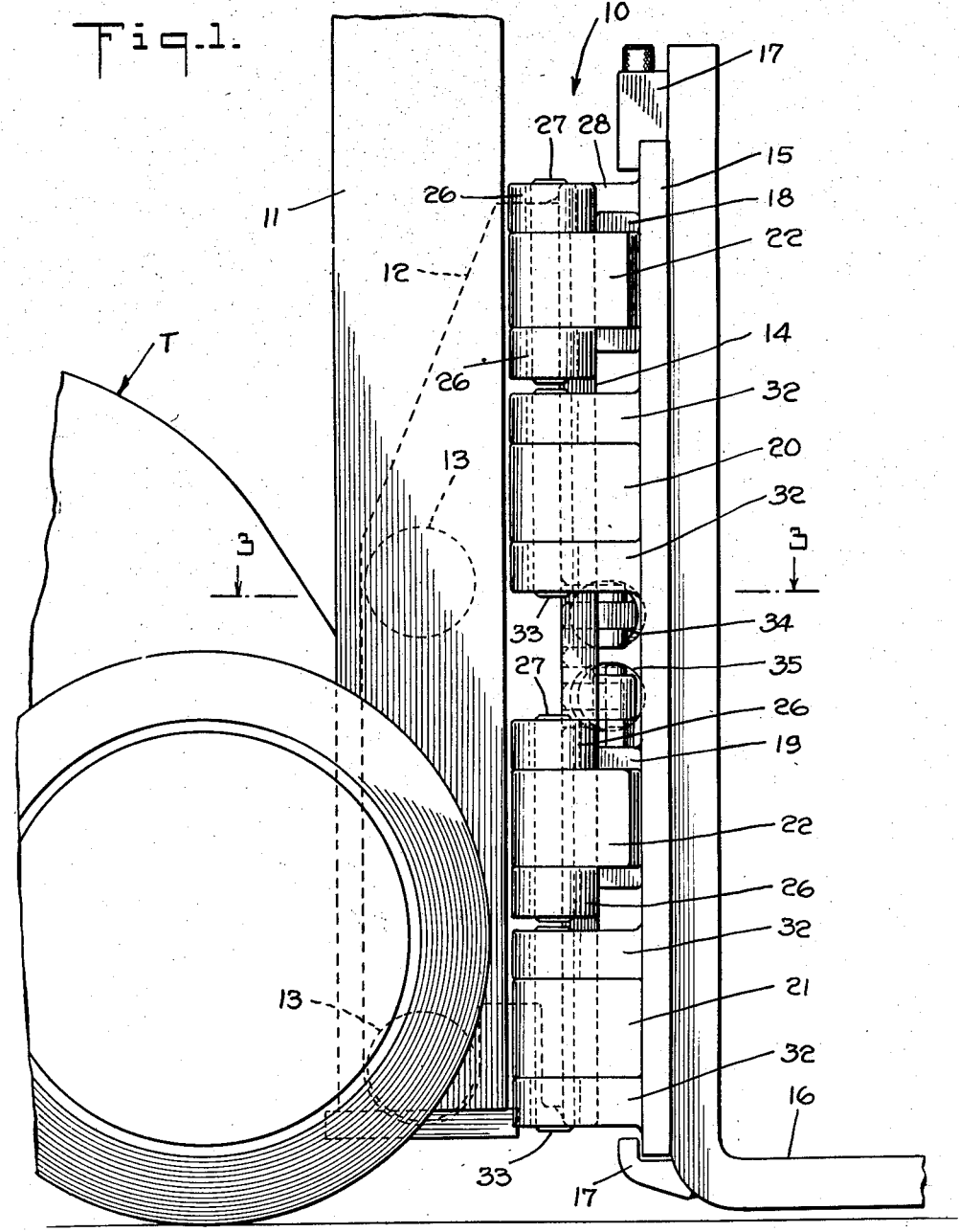
INVENTOR
Frank A. Vossenberg
BY A. H. Golden
ATTORNEY July 28, 1959     F. A. VOSSENBERG     2,896,806
PLATFORM PIVOTING MEANS FOR INDUSTRIAL TRUCK
Filed June 15, 1956     3 Sheets-Sheet 2
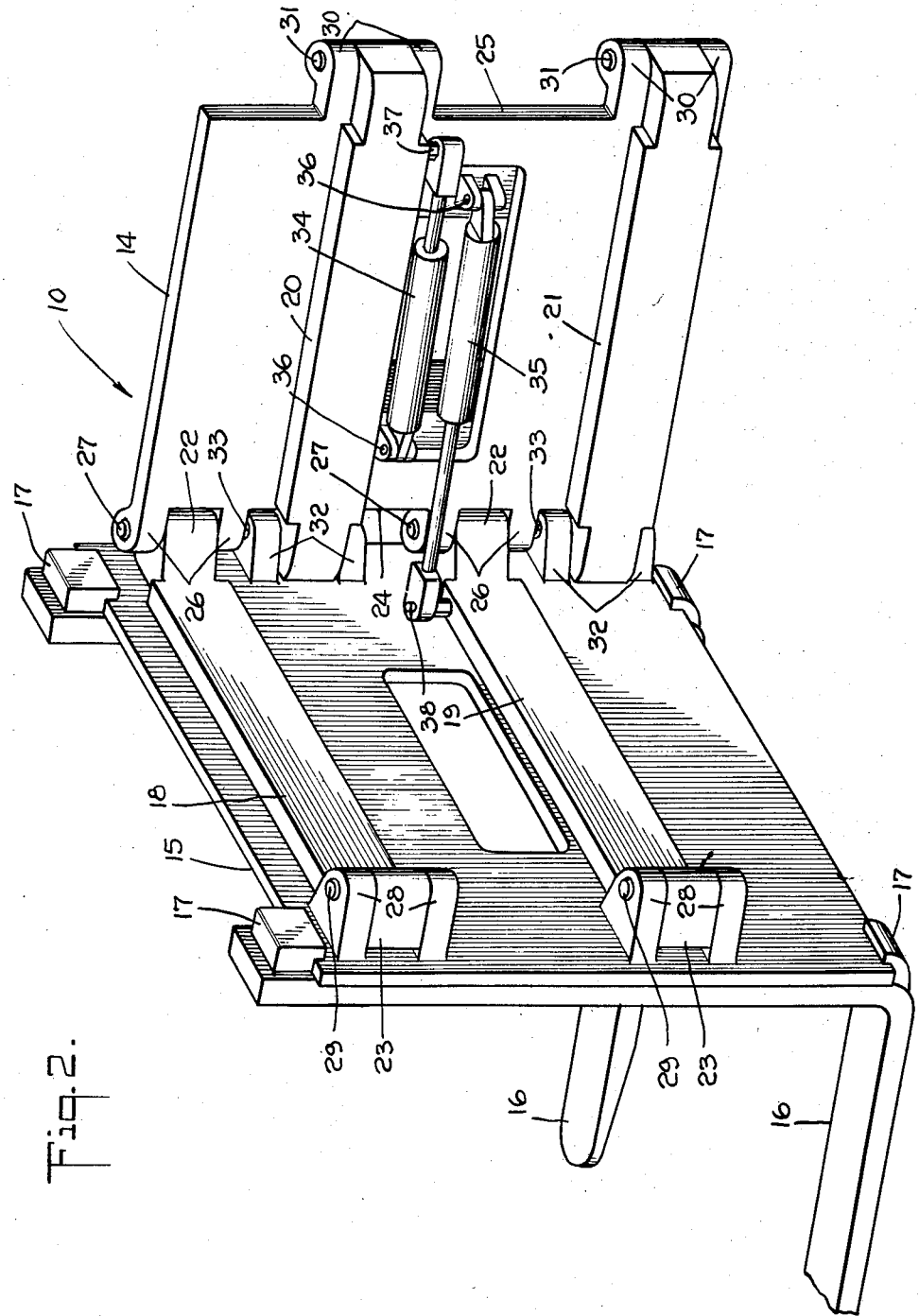
INVENTOR
Frank A. Vossenberg
BY
ATTORNEY July 28, 1959     F. A. VOSSENBERG     2,896,806
PLATFORM PIVOTING MEANS FOR INDUSTRIAL TRUCK
Filed June 15, 1956     3 Sheets-Sheet 3
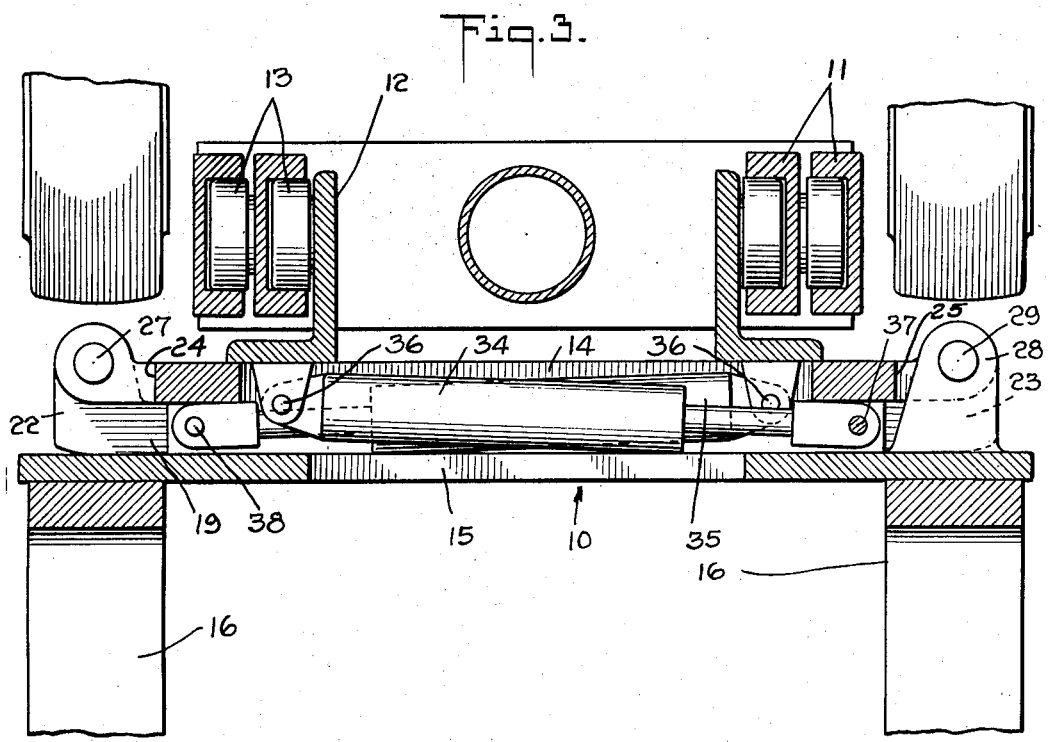
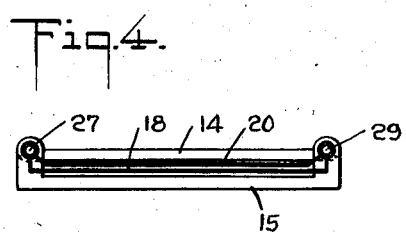
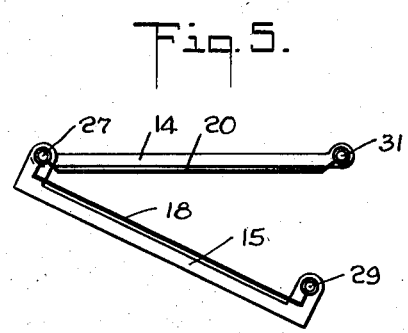
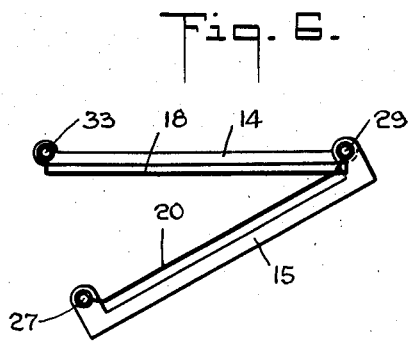
INVENTOR
Frank A. Vossenberg
BY
A. H. Golden
ATTORNEY

United States Patent Office 2,896,806
Patented July 28, 1959

2,896,806

PLATFORM PIVOTING MEANS FOR INDUSTRIAL TRUCK

Frank A. Vossenberg, Strafford, Pa., assignor to The Yale & Towne Manufacturing Company, Stamford, Conn., a corporation of Connecticut Application June 15, 1956, Serial No. 591,753

3 Claims. (Cl. 214—730)

This invention relates to an industrial truck, and more particularly to means for swinging the load platform of an industrial truck in opposed directions so as to facilitate the movement of the truck through narrow aisles, and particularly in the turning of the truck from one narrow aisle into another.

A number of patents have been issued to inventors covering means for swinging a load platform, and for means that shift and swing a load platform, all for the general purpose I have herein outlined. However, so far as I know, no prior construction has been entirely successful. Thus, the constructions used for pivoting the load platform or load carrier have most frequently relied on a pivot positioned in or near the central axis of the truck, and it has been proposed that this pivot be shifted axially of the truck under certain conditions. As a feature of my invention, I make it possible to pivot the platform on an axis positioned at or near the extreme side of the truck. The advantages of pivoting about an axis so positioned will naturally be quite obvious, particularly since I arrange to pivot the load platform or carrier in either of opposed directions about pivots at each of the opposed sides of the truck.

Those skilled in the art will appreciate that the shorter the design of an industrial truck the easier it is to manipulate that truck in narrow aisles and to turn the truck from one narrow aisle into another. Naturally, the load platform pivoting mechanism should be so constructed as to take up little or no room. While this objective has been understood by those skilled in the prior art, a review of prior art constructions will indicate that considerable room is required for the load platform pivoting means. It is a feature of my invention that the pivoting means are so positioned and so arranged in the construction I have conceived, as to occupy but little space longitudinally of the truck. Not only do the pivoting means occupy little space, but they enable the platform to pivot without substantial movement toward the truck, so that the platform can be arranged extremely close to the front of the truck. This will all be quite obvious upon an examination of the drawings of this application and a review of the specification that follows. It can be stated particularly, however, that the two most important features of my invention are the pivotal arrangement at the sides of the truck together with means occupying a minimum of space longitudinally of the truck.

Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a side view showing my novel platform pivoting means on the front end of an industrial truck.

Fig. 2 is a perspective view showing my novel means pivoting in one direction.

Fig. 3 is a cross-section on the line 3—3 of Fig. 1.

Figs. 4, 5 and 6 are diagrammatic views showing the operation of my novel platform pivoting means.

Referring more particularly to Fig. 1 of the drawings, I indicate my novel platform pivoting means generally by the numeral 10, and I show those means utilized on a truck T of the type having uprights 11 and a lifting carriage 12 that is mounted through rollers 13 for vertical movement on those uprights. In the particular arrangement, the lifting carriage 12 has a vertical plate 14 that is formed as a base member for my pivoting means 10. However, it is to be understood that the details of the front end of the truck are not important to an understanding of my invention, and it is necessary to know merely that the truck supports the plate or base member 14. I further show my novel pivoting means 10 equipped with a vertical carrier plate 15, with load forks 16 supported on that plate 15 through upper and lower clips 17. Of course, I do not wish to be limited to forks, since it is conceivable that the carrier plate 15 may support other types of load platform or carrier.

My extremely novel platform pivoting means 10 will be best understood if we now refer to Fig. 2 of the drawings. In Fig. 2, I show the vertical carrier plate 15 swinging in one direction relatively to the base member 14 on two links 18, 19, those links moving with the plate 15. In the construction that I prefer, I utilize two further links 20, 21, that are shown in Fig. 2 against the base member 14, but my invention will be better appreciated if we first consider merely the links 18, 19.

As may be seen in Fig. 2, I make each link 18, 19 relatively long, and I form its opposed ends with bearing portions 22, 23 that extend in an angular direction. The bearing portions 22, 23 on each link will lie at opposed sides 24, 25 of base member 14 when the carrier plate 15 is in an initial centered position relatively to the truck T. This will be well understood when considering Fig. 3, in which I show link 19 in a transverse position, with its bearing portions 22, 23 extending in a rearward direction at the sides of base member 14.

Extending from the side 24 of base member 14 I form bearing brackets 26, well shown in Fig. 2 and I utilize pivots 27 between those brackets and one end bearing portion 22 of each link 18, 19. It will thus be seen that I pivot links 18, 19 at one end to base member 14 in an axis that is beyond the side 24 of the base member.

I equip the opposed side of carrier plate 15, shown at the left in Fig. 2, with brackets 28 having pivots 29 whereby I pivot plate 15 to the bearing portion 23 on each link 18, 19. I shall presently describe the manner in which the carrier plate 15 rotates on the pivots 29, but first I shall call attention to the fact that plate 15 when moving as in Fig. 2 does not rotate on those pivots 29. Plate 15 instead moves with links 18, 19 in the axis of pivots 27. When carrier plate 15 is in its centered position, as I have already described while referring to Fig. 3, pivots 29 will lie at the side 25 of base member 14. Therefore, with the carrier plate 15 in centered position, pivots 27 and pivots 29 are at opposed sides 24, 25 of the base member 14, whereby to contribute a pivot axis at each extreme side of the truck.

It will be appreciated that the links 18, 19 in the construction I have thus far described will support the carrier plate 15 and load forks 16 relatively to the base member 14. Further, by rotating on the pivots 27, the links 18, 19 can swing carrier plate 15 in one direction as shown in Figs. 2 and 5. By remaining in juxtaposed relation to the base member 14, links 18, 19 will support the carrier plate 15 for swinging on pivots 29 in the opposed direction, as shown diagrammatically in Fig. 6. In other words, links 18, 19 will support carrier plate 15 while enabling that plate to swing in either direction relatively to the truck T.

I shall emphasize that I achieve those swinging movements through the utilization of a pivot axis at each extreme side of the truck, as represented by the pivot pins 27 and 29. By their particular position, the pivots 27, 29 enable me to mount the carrier plate 15 and forks 16 very close to the front of the truck. This will be understood when it is realized that the construction of links 18, 19, together with the mountings of pivots 27, 29, enable the links to lie in juxtaposed relation not only to the base member 14, but also to the carrier plate 15 when the load carrier is in its initial centered position, shown in Figs. 1, 3, and 4. Thereby my pivoting means will occupy an extremely small space on the truck, and in addition will enable the carrier to swing without substantial movement of the carrier toward the truck. This will be better appreciated when considering Fig. 2, since it will be seen in that figure that the pivot axis, as represented by pivots 27, is quite near the edge of the carrier plate 15. Thus, I am able through my construction to support the load carrier for swinging movement through a very large angle in either direction, but with the carrier mounted near the front of the truck.

Of course, it will be realized that the links 18, 19 move together on their pivots 27, and therefore it may be said that those links in effect are a single integral link. However, I do prefer to make those links separate as I have shown in the drawings.

I believe that the very considerable advantages of the novel structure utilizing the links 18, 19 will be well appreciated. Nevertheless, I achieve further advantages through the utilization of the links 20, 21, to which I have already referred. Those links 20, 21 are like the links 18, 19, but are pivoted in opposed relation to the links 18, 19. More particularly, I pivot each link 20, 21 relatively to the edge 25 of base member 14, utilizing for that purpose pivot brackets 30 having a pivot 31 for each link. On the opposed side of carrier plate 15, I utilize brackets 32 having pivots 33. The links 20, 21, together with their pivots and pivot brackets, are offset in a vertical direction relatively to the links 18, 19 and their corresponding pivots 27, 29 whereby the links will have clearance relatively to one another. This will enable all of the links to be juxtaposed to carrier plate 15 and the base member 14 when the load carrier is in centered position, as shown in Figs. 1, 3 and 4. When the carrier is in that position, all of the pivots 27 and 33 at one side of the truck will be aligned in a vertical axis, and the pivots 29 and 31 at the opposed side of the truck also will be aligned in a vertical axis. Through that arrangement, the load carrier when rotating with the links 18, 19 on the pivots 27, will also rotate on the pivots 33 relatively to the links 20, 21, as shown in Fig. 2. Naturally, this same type of action will occur when carrier plate 15 swings in the opposed direction, shown in Fig. 6, but with links 20, 21 then rotating with the carrier plate 15, and links 18, 19 remaining stationary. By utilizing the links 20, 21 as well as the links 18, 19, I am able to support the carrier plate 15 and load forks 16 at each opposed side while swinging in the manner that I have described.

In order to effect the swinging movements of the carrier, I prefer to utilize two hydraulic rams 34, 35 best seen in Fig. 2. I pivot each ram 34, 35 to base member 14 through a pin 36, with the rams so arranged as to act in opposed directions. Ram 34 acts on link 20 through a connection 37, and ram 35 similarly acts on link 19 through a connection 38. Therefore, by actuating ram 35, I can rotate links 18, 19 to swing the load carrier about pivots 27 and 33 in one direction. Also, with links 18, 19 in their initial position juxtaposed to base member 14, I can actuate ram 34 to rotate links 20, 21 whereby to swing the carrier about pivots 29, 31 in the opposed direction.

I believe that those skilled in the art will now appreciate that I have contributed a platform pivoting construction that is extremely novel and that has very considerable value. By utilizing a pivot axis at each opposed side of the truck, I can rotate the load forks or platform in either direction relatively to an initial centered position, yet I am able to arrange the pivots and platform supporting structure in extremely little longitudinal space on the truck. Thereby, I make possible the mounting of the load carrier very close to the front of the truck, but with the carrier supported for swing movement through a very large angle whether swinging to the left or to the right. While accomplishing these things, I am able nevertheless to support the load carrier at points on each opposed side of the carrier, regardless of the position to which the carrier moves relatively to the truck. I thereby have conceived an extremely novel load platform pivoting construction that represents a very considerable contribution to the truck industry.

I now claim:

1. In a truck of the class described, a base member, a load carrier forwardly displaced from the base member, a first link pivoted at one end to one side of said base member and at its other end to one side of said load carrier, a second link similarly pivoted to said base member and load carrier but in opposed relation to said first link, said links lying in a juxtaposed initial relation to said base member and load carrier and therebetween, hydraulic means positioned between said base member and load carrier for rotating said load carrier and first link together about the pivot between said first link and base member whereupon said link moves with said load carrier while the second link remains in its juxtaposed relation to said base member, and hydraulic means positioned between said base member and load carrier for rotating said load carrier with said second link about the pivot between said second link and base member whereupon said first link will remain in juxtaposed relation to said base member.

2. In a truck of the class described, a load carrier, a base member for the load carrier on the front of the truck, a vertical pivot on each side of the base member, first and second links, each of said links mounted at one end for rotation on one of said pivots, said links arranged in vertically offset relation to one another whereby each link when rotating moves into and out of juxtaposed relation to the base member, a second vertical pivot on the other end of each link, each link when juxtaposed to the base member supporting its second pivot in aligned relation to the pivot on which the other link rotates, means mounting the load carrier for rotation on the second pivot of each link with the first and second links supporting the carrier at opposed sides thereof, the first pivot of each link together with the second pivot of the other link contributing at either side of the truck an axis in which the load carrier will swing relatively to the truck, and both links acting when in their juxtaposed relation to the base member to support the load carrier in an initial centered position that is juxtaposed to the links whereby to place the carrier close to the front of the truck.

3. In a truck of the class described, a base member, a load carrier normally closely positioned forwardly of said base member, a first link pivoted at one end to said base member and at its opposite end to said load carrier for supporting the load carrier in closely positioned relation to said base member, a second link similarly pivoted to said base member and load carrier but in opposed relation to said first link for assisting said first link in supporting said load carrier, said links lying in a juxtaposed initial relation to said base member and load carrier and arranged in vertically spaced relation to one another whereby each link when rotating moves into and out of juxtaposed relation to the base member, hydraulic means for rotating said load carrier and first link together about the pivot between said first link and base member whereupon said link moves with said load carrier while the second link remains in its juxtaposed relation to said base member, and hydraulic means for rotating said second link and base member whereupon said first link remains in juxtaposed relation to said base member.

References Cited in the file of this patent

UNITED STATES PATENTS

| | | |
|---|---|---|
| 1,525,397 | Keene | Feb. 3, 1925 |
| 1,722,156 | Paulson | July 23, 1929 |
| 2,511,777 | Kujawa | June 13, 1950 |
| 2,706,062 | Turner | Apr. 12, 1955 |
| 2,709,017 | Ulinski | May 24, 1955 |
| 2,753,066 | Arnot | July 3, 1956 |
| 2,756,888 | Avery | July 31, 1956 |
| 2,799,418 | Haldimann | July 16, 1957 |